Dec. 12, 1961 H. BOYSEN 3,012,279
SINGLE- AND DOUBLE-HEATING VULCANIZING PRESS
Filed July 22, 1959 2 Sheets-Sheet 1

INVENTOR
Heinz Boysen
BY
Beaman & Beaman

Dec. 12, 1961 H. BOYSEN 3,012,279
SINGLE- AND DOUBLE-HEATING VULCANIZING PRESS
Filed July 22, 1959 2 Sheets-Sheet 2
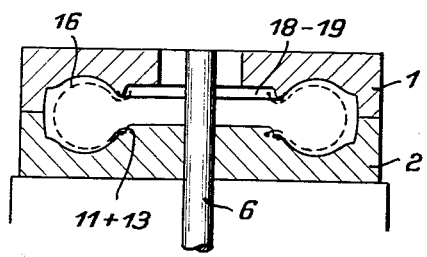
Fig. 6
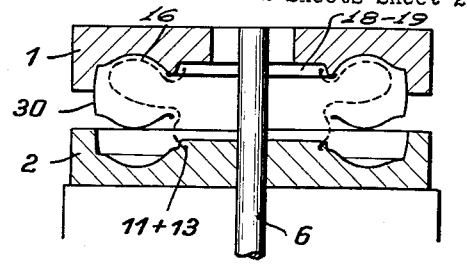
Fig. 7
Fig. 8
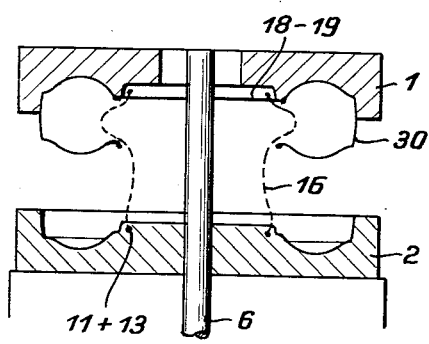
Fig. 9
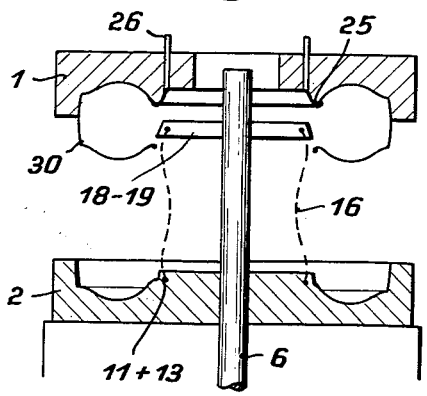
Fig. 10
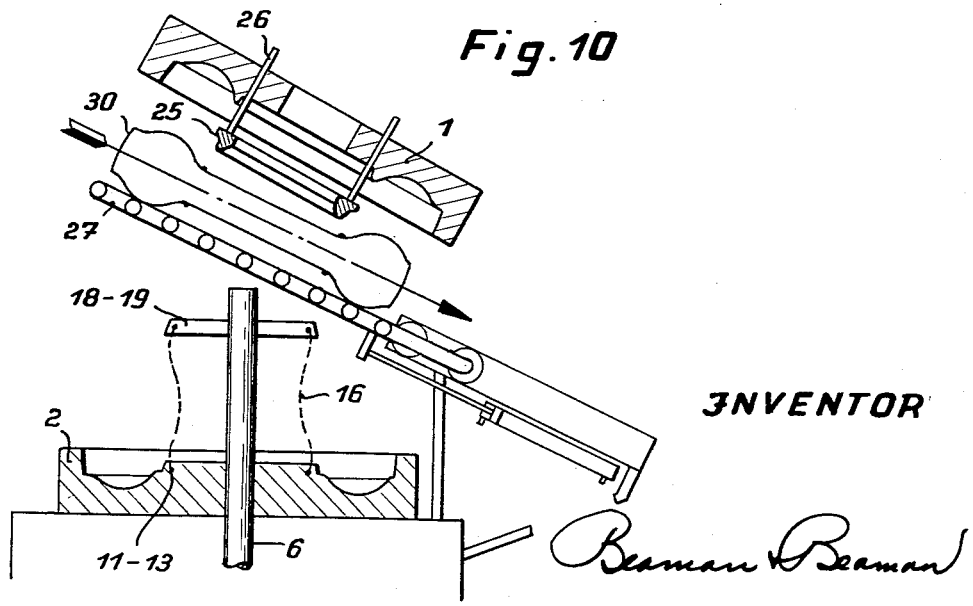
INVENTOR
Beaman & Beaman United States Patent Office 3,012,279
Patented Dec. 12, 1961

3,012,279
SINGLE- AND DOUBLE-HEATING VULCAN-
IZING PRESS
Heinz Boysen, Hamburg-Harburg, Germany, assignor to
Christiansen & Meyer, Hamburg-Harburg, Germany, a
corporation
Filed July 22, 1959, Ser. No. 828,854
Claims priority, application Germany July 23, 1958
3 Claims. (Cl. 18—17)

The invention relates to a single- and double-heating vulcanizing press for manufacturing rubber tires.

Such presses are known for manufacturing rubber tires from a flat band, with a fixed lower mould half and an upper mould half movable with respect to it, in which the secured ends of an inflatable tube are movable toward and away from one another in the axial direction. In known presses of this kind, two axially movable clamping rings are provided for securing the ends of the inflatable tube, whereby the tire may rest upon the lower clamping ring. In such presses, an axial operation of both the lower and upper support rings is necessary, whereby the constructional requirements for driving these two support rings is considerable. Moreover, the devices for holding the tire already moved out from the mould halves during withdrawal of the inflatable tube are quite expensive and complicated.

Furthermore, the inside of the inflatable tube must be successively connected to a source of low pressure, to a compressed air source and to a steam pressure source, wherein it is necessary to connect the requisite ducts through a movable part and particularly the lower support ring, which both constructionally ad operationally involves considerable disadvantages.

According to the invention, for avoiding these disadvantages, only one axially movable clamping ring is provided for holding the upper secured end of the inflatable tube, whereas the lower end of the inflatable tube is immovably secured with respect to the lower mould half. By this means, only the upper clamping ring need be moved axially and a considerable simplification of the construction is achieved.

Moreover, it is possible, in this way, to raise the prepared vulcanized tire together with the upper mould half from the lower mould half and move it upwardly, whereby the final removal of the tire from the mould and conveyance of the tire away from the vulcanizing press are substantially simplified. Finally, in this way, the supply of the sub-pressure, the compressed air and the steam pressure to the inside of the inflatable tube are considerably simplified and made more reliable.

As will already appear from the above, in the invention, the prepared vulcanized tire is moved upwardly, on opening the mould halves, together with the upper mould half. The opening movement of the upper mould half is strictly axial by an amount which approximately corresponds to the stroke of the upper clamping ring. It is recommendable to control the movement of the upper clamping ring so that it is always pressed against the upper mould half, both during its opening movement and during its closing movement. This is particularly suitable with the opening movement, since in this way the relatively stiff inflatable tube is pressed against the upper should part or bead ring of the prepared vulcanized tire, at the start of the opening movement, so that the inflatable tube contributes to the tire being carried with the upper mould half and thus being withdrawn from the lower mould half.

In this connection, it is suitable to make the outer diameter of the lower part of the upper clamping ring somewhat greater, by about the extent by which the inflatable tube is bent inwards in the stretched state under the influence of the internal sub-pressure, than the upper part of the lower clamping ring. This condition implies no limitation, however, and will only give an idea as to how the outer diameter of the lower part of the upper clamping ring is to be chosen greater. In this way, the support of the inflatable tube by the lower part of the upper clamping ring is increased, so that at the beginning of the opening movement of the upper mould half, the tube is stiffer in the region of the upper bead ring of the tire and so conveys the tire better in the opening movement.

According to the invention, moreover, the upper mould half is preferably provided with an ejector or an ejectable shoulder ring, by means of which the tire is ejectable from the upper mould half after stretching and removal of the inflatable tube from the tire. Furthermore, according to the invention, a preferably inclined catch member is movable between the raised upper clamping ring and the fully-open and already inclined upper mould half. The tire ejected from the upper half is caught by the catch member and, because of the inclined position thereof, immediately slides down to a container or conveyor device arranged by the press.

Further improvements and suitable constructions of the invention are explained below in conjunction with the accompanying drawings, which show diagrammatically an embodiment of the invention, omitting all parts which are not necessary for understanding the invention.

In the drawings:

FIGS. 2 to 10 show diagrammatic drawings for illustrating the mode of operation of the press according to the invention.

Figure 1:
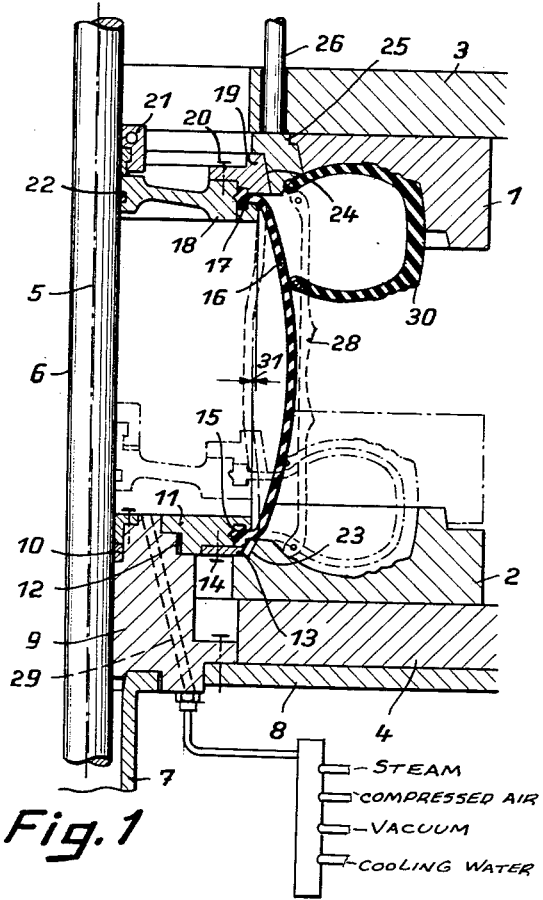
FIG. 1 shows a half-section through the parts essential to the invention of a vulcanizing press constructed according to the invention, in the half open state.

According to FIG. 1, the press includes an upper mould half 1 and a lower mould half 2 and is provided in the usual way with a heating plate 3 above the upper mould half 1 and a heating plate 4 below the lower mould half 2. FIG. 1 shows only one half of the press in axial section for simplicity. A piston rod 6 is arranged in the axis 5 of the mould halves 1, 2 and passes through the mould halves 1, 2 and the heating plates 3, 4. This piston rod 6 terminates shortly above the open position of the heating plate 3 and is connected, in a manner not shown, with a piston which is arranged below it and is movable in a cylinder 7. The cylinder 7 is secured to a part 8 of the frame of the machine. A lower clamping ring, composed of an upper part 11 and a lower part 13, is screwed on to an insert 9, which serves to receive a stop bushing 10 sealing the piston rod 6, by means of a screw thread 12 or, for example, a bayonet connection. The two clamping rings 11 and 13 are rigidly connected together by screws 14 and serve to secure the lower end 15 of an inflatable tube 16. The upper end 17 of the tube 16 is held between the lower part 18 and the upper part 19 of an upper clamping ring, which parts are rigidly secured together by screws 20. The lower part 18 of the upper clamping ring is extendable by the piston rod 6 by means of a two-part clamping ring 21 and is sealed with respect to it by means of a sealing ring 22.

Whereas the lower clamping ring 11, 13 is supported by a conical surface 23 directly on the lower mould half 2, the upper clamping ring 18, 19 rests with a conical surface 24 against a shoulder or ejector ring 25, which forms the shoulder part of the upper mould half 1. Ejecting rods 26 are guided through the upper heating plate 3 and, in a manner not shown in detail, can be moved out of the region of the upper mould half 1 by axial movement of the ejector or shoulder ring 25.

FIG. 1 shows the parts in that position which they assume on full lifting of the upper clamping ring 18, 19.

For the purpose of opening, the upper mould half need only be moved axially upwards by a short amount and then pivoted in known manner. The inflatable tube 16 is shown in full lines in the position which it assumes after compressed air has been let into its inside. The tube is shown in broken lines in the position which it assumes when its inside has been placed under a slight sub-pressure. In this position, the tire carcass can be raised with the mould half 1 open. This carcass is likewise shown in dotted lines and is indicated at 28. The ducts for supplying compressed air, the sub-pressure and steam pressure to the inside of the tube 16 pass through the insert 9 rigidly connected to the support 8. The duct for supplying heating steam, for example, is indicated at 29.

The prepared vulcanized tire raised with the upper mould half 1 is shown at 30 in FIG. 1. The lowermost position of the upper clamping ring 18, 19 is shown chain-dotted in FIG. 1, together with the position of the tube 16 which this then assumes.

The outer diameter of the lower part 18 of the upper clamping ring is greater by about twice the amount 31 than the outer diameter of the upper part of the lower clamping ring 11. This amount corresponds to the inward bending of the tube 16 with an internal sub-pressure. The lower part of the upper clamping ring can be made larger than this amount without affecting withdrawal of the tire carcass.

The mode of operation of the invention is explained in more detail in connection with FIGS. 2 to 10. As already mentioned, the upper clamping ring 18, 19 is suitably so controlled that it rests against the upper mould half 1 during its total stroke. This can be effected in a particularly simple way, for example, in that the cylinder for operating the piston rod 6 is supplied with compressed air. The force acting on the operating piston of the piston rod 6 is substantially less than the sliding force of the mould half 1, so that the objection to such a simplification is correspondingly so much less, that a control of the cylinder operating the upper clamping ring 18, 19 with separate means is completely dispensed with.

Figure 2:
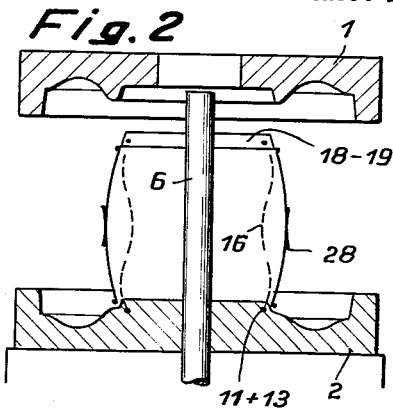
Figure 3:
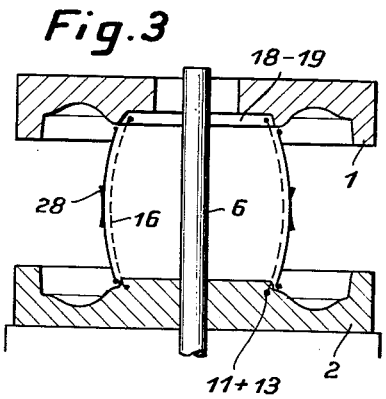
Figure 5:
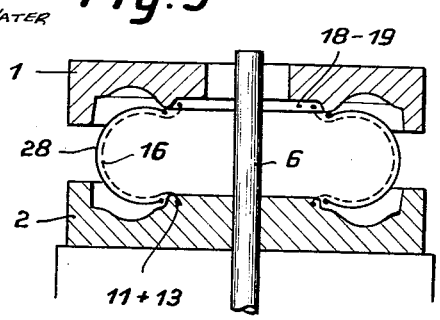
Figure 4:
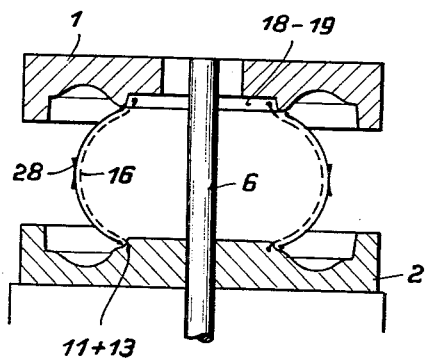

In order to set up the tire carcass 28, the inside of the inflatable tube 16 is placed under a slight sub-pressure in known manner. The upper mould half 1 can now be moved downwardly. This position is shown in FIG. 2. According to FIG. 3, the upper mould half 1 rests against the upper clamping ring 18, 19. The inside of the inflatable tube is then connected to the compressed air source. As shown in FIGS. 4, 5 and 6, the upper mould half 1 is moved axially further downward together with the upper clamping ring 18, 19 until, as shown in FIG. 6, the mould is fully closed. During this time, the tire carcass is pressed into the mould under the influence of the compressed air acting inside the inflatable tube 16. The final position of the parts is shown in FIG. 6 and in dotted lines in FIG. 1.

Vulcanization of the tire is now effected by heating through the plates 3 and 4 by introducing steam into the inside of the tube 16. After completing vulcanization, the mould is opened, the upper mould half 1 being first moved upwardly parallel to the axis 5. The upper clamping ring 18, 19 is continually pressed against the upper mould half.

FIGS. 7 and 8 show how more and more of the tube is drawn out at its lower end from the tire, the upper edge of the tube, which lies in the vicinity of its upper securing position, holding the tire and particularly its part lying in the vicinity of the upper bead ring. As shown in FIG. 9, the upper clamping ring 18, 19 has completely withdrawn from the prepared vulcanized tire, the upper mould half 1 having become removed from the upper clamping ring 18, 19. The tube 16 is then put under a slight sub-pressure in order to facilitate movement of the lower bead ring of the tire past the upper clamping ring 18, 19.

The upper mould half is now moved axially by the amount necessary in order to move the prepared vulcanized tire away from the region of the upper clamping ring 18, 19. The upper mould half is then tilted in known manner as shown in FIG. 10. In its final position the ejector ring 25 is moved by operation of the rods 26 so that the prepared tire 30 is pushed out from the upper mould half 1 and falls on to a catch plate or grid 27 which has been moved between the upper mould half 1 and the upper clamping ring 18, 19. The prepared tire 30 then moves away from the press, as shown by the arrow, under the influence of its weight.

What I claim is:

1. In a vulcanizing press for forming tires from a band-like tire carcass, a lower mold half fixedly mounted on a stationary plate, a vertically movable upper mold half, a centrally disposed flexible tube extending upwardly from said lower mold half forming a hermetically closed inner space, the lower end of said tube being secured between an upper and a lower clamping ring mounted on said lower mold half and the upper end of said tube being secured between a lower circular plate and an upper clamping ring, the outside diameter of said lower circular plate determining the upper diameter of said tube being larger than the outside diameter of said upper clamping ring at the lower end of said tube which determines the diameter of the lower end of said tube, a centrally arranged piston rod slidably extending through said lower mold half, said inner space of said tube and said circular plate closing the upper end of said tube, said circular plate being secured to said piston rod for axial adjustment thereto, a pressure operated piston operably connected with the lower end of said piston rod constantly urging said circular plate closing the upper end of said tube against said upper mold half, inlet and outlet ports communicating with said hermetically closed inner space of said tube and a source of compressed air introducing superatmospheric air pressure into said tube during downward motion of said upper mold half, and means operative during placing said tire carcass over said tube creating subatmospheric pressure conditions within said tube, and a steam source communicating with said tube operative during the vulcanizing stage.

2. In a vulcanizing press for forming tires from a band-like tire carcass, a lower mold half fixedly mounted on a stationary plate, a vertically movable upper mold half, a centrally disposed flexible tube extending upwardly from said lower mold half forming a hermetically closed inner space, the lower end of said tube being secured between an upper and a lower clamping ring mounted on said lower mold half and the upper end of said tube being secured between a lower circular plate and an upper clamping ring, the outside diameter of said lower circular plate determining the upper diameter of said tube being larger than the outside diameter of said upper clamping ring at the lower end of said tube which determines the diameter of the lower end of said tube, a centrally arranged piston rod slidably extending through said lower mold half, said inner space of said tube and said circular plate closing the upper end of said tube, said circular plate being secured to said piston rod for axial adjustment thereto, a pressure operated piston operably connected with the lower end of said piston rod constantly urging said circular plate closing the upper end of said tube against said upper mold half, inlet and outlet ports communicating with said hermetically closed inner space of said tube, a source of compressed air introducing superatmospheric air pressure into said tube during downward motion of said upper mold half, means operative during placing said tire carcass over said tube creating subatmospheric pressure conditions within said tube, a steam source communicating with said tube operative during the vulcanizing stage, said movable upper mold half being provided with a concentric ledge ring having a central recess for centering said upper clamping ring at the upper end of said tube, said ledge ring being relatively movable to said upper mold half and ejecting said finished tire therefrom when said upper mold half reaches its upper position.

3. In a vulcanizing press for forming tires from a band-like tire carcass, a lower mold half fixedly mounted on a stationary plate, a vertically movable upper mold half, a centrally disposed flexible tube extending upwardly from said lower mold half forming a hermetically closed inner space, the lower end of said tube being secured between an upper and a lower clamping ring mounted on said lower mold half and the upper end of said tube being secured between a lower circular plate and an upper clamping ring, the outside diameter of said lower circular plate determining the upper diameter of said tube being larger than the outside diameter of said upper clamping ring at the lower end of said tube which determines the diameter of the lower end of said tube, a centrally arranged piston rod slidably extending through said lower mold half, said inner space of said tube and said circular plate closing the upper end of said tube, said circular plate being secured to said piston rod for axial adjustment thereto, a pressure operated piston operably connected with the lower end of said piston rod constantly urging said circular plate closing the upper end of said tube against said upper mold half, inlet and outlet ports communicating with said hermetically closed inner space of said tube, a source of compressed air introducing superatmospheric air pressure into said tube during downward motion of said upper mold half, and means operative during placing said tire carcass over said tube creating subatmospheric pressure conditions within said tube, a steam source communicating with said tube operative during the vulcanizing stage, said movable upper mold half being provided with a concentric ledge ring having a central recess for centering said upper clamping ring at the upper end of said tube, said ledge ring being relatively movable to said upper mold half ejecting said finished tire therefrom when said upper mold half reaches its upper position, an inclined conveyor movable to a position below said upper mold half during the last phase of its upward movement and being adapted to receive and remove said finished tire rearwardly out of the press.

References Cited in the file of this patent

UNITED STATES PATENTS

| | | |
|---|---|---|
| 2,713,382 | Bosomworth et al. | July 19, 1955 |
| 2,730,763 | Brundage | July 17, 1956 |
| 2,741,799 | Heston | Apr. 17, 1956 |
| 2,832,991 | Soderquist | May 6, 1958 |
| 2,832,992 | Soderquist | May 6, 1958 |
| 2,880,459 | Weigold et al. | Apr. 7, 1959 |